United States Patent [19]

Frizlen

[11] Patent Number: 4,592,051
[45] Date of Patent: May 27, 1986

[54] ACTIVATION IN A DIGITAL SUBSCRIBER CONNECTION

[75] Inventor: Hans-Jörg Frizlen, Trångsund, Sweden

[73] Assignee: Telefonaktiebolaget LM Ericsson, Stockholm, Sweden

[21] Appl. No.: 626,869
[22] PCT Filed: Dec. 14, 1983
[86] PCT No.: PCT/SE83/00449
§ 371 Date: Jun. 29, 1984
§ 102(e) Date: Jun. 29, 1984
[87] PCT Pub. No.: WO84/02815
PCT Pub. Date: Jul. 19, 1984

[30] Foreign Application Priority Data

Dec. 30, 1982 [SE] Sweden ............... 8207518

[51] Int. Cl.[4] .............................. H04J 3/06
[52] U.S. Cl. ........................ 370/103; 370/100
[58] Field of Search ............ 370/100, 103, 110.1, 370/58; 375/107; 179/99 M

[56] References Cited

U.S. PATENT DOCUMENTS 4,143,246 3/1979 Smith .................. 370/100
4,314,109 2/1982 Sokiguchi et al. ........ 370/103
4,355,386 10/1982 Binz et al. .............. 370/100

Primary Examiner—Douglas W. Olms
Assistant Examiner—Frank M. Scutch, III
Attorney, Agent, or Firm—Roberts, Spiecens & Cohen

[57] ABSTRACT

The invention relates to a method and apparatus in a telecommunication system for activation of means from idling state to active state. The system includes a digital subscriber connection in which there is included a line terminal (LT) assigned to the station side of the system, a network terminal (NT) assigned to the subscriber installation and one or more subscriber terminals (ST). The line terminal is connected to a central clock pulse oscillator (master oscillator) (MCL) on the station side, the network terminal and subscriber terminals containing local clock pulse oscillators (slave oscillators) (CL). In activation from the subscriber side, a subscriber terminal (ST) sends an activation request (AR) in the form of a bit pattern sent in bursts to the network terminal (NT) via a TDM bus line (BL). The network terminal sends the activation request (AR) to the line terminal (LT), in the form of a continuously sent, cyclic bit pattern. The line terminal sends an activation request to a station (EX), which then sends an activation order (AO) back to the line terminal, which sends an activation order (AO) in the form of a continuous bit pattern back again to the network terminal (NT). The network terminal then sends an activation order in the form of bit bursts to the subscriber terminal (ST). The subscriber terminal sends the activation order signal to the subscriber. In activation from the station side the activation order goes directly from the station without a preceding activation request from the subscriber.

4 Claims, 3 Drawing Figures

ACTIVATION IN A DIGITAL SUBSCRIBER CONNECTION

TECHNICAL FIELD

The invention relates to a method and apparatus in a telecommunication system for activating subscriber terminals in a digital subscriber connection including a line terminal assigned to the station side of the system, a network terminal assigned to the subscriber installation and one or more subscriber terminals, the line terminal being connected to a central clock pulse oscillator at the station side, and the network terminal and subscriber terminals containing local clock pulse oscillators.

BACKGROUND ART

It is already known to switch over subscriber terminals from an idling state to an activated state with the aid of special activation signals in the form of DC signals.

DISCLOSURE OF INVENTION

A problem occuring in the DC activation of subscriber terminals is the requirement of detecting different DC levels to enable distinguishing between idle condition currents and activating currents. Since the idle condition current is used to maintain certain functions in the terminal during the idling state also, the level of the idle condition current is thus limited by the activation signal level, there being limits to how low the former may fall and how high the latter may rise. This results in a small margin between the different voltage levels and thereby increases sensitivity to interference. Furthermore, in possible standardization one will be tied to a technique which is not optimized for the future.

The method and apparatus in accordance with the invention are characterized by the claims, and solve the problem by the activation being carried out digitally in loops with the aid of binary code words.

The system includes, as mentioned, a line terminal LT on the station side of a connection, a network terminal NT assigned to the subscriber installation and one or more subscriber terminals ST. (See FIG. 1)

Activation can be performed in synchronous or asynchronous/plesiochronous operation, and may be initiated either from the subscriber side (the subscriber terminal ST) or from the station side (the line terminal LT).

In activation started from the subscriber terminal ST, terminal ST sends an activation request AR giving rise to temporary synchronization of the clock in the network terminal NT with the clock from the terminal ST, and also the temporary activating of the network terminal NT. The clock signal in the terminal ST is plesiochronous in relation to the clock signal in the line terminal LT, which terminal is connected to the station clock functioning as master. With activation of the network terminal, the activation request is sent from it to the line terminal LT which, on received activation request via the station (EX), sends out the activation order AO to the terminal NT in the same way as the activation was started from the line terminal LT. The activation-synchronization signal received in the terminal NT gives rise to the final activation of the terminal, its synchronization to the clock pulse from the line terminal, and transmission, of equal signals to the subscriber terminal ST. An activation-synchronization signal received in the terminal ST from the terminal NT provides the final activation of the former and its synchronization to the clock pulse from the line terminal LT.

In starting activation from the line terminal LT no activation request is sent, but an activation order is sent, as previously mentioned, directly to the terminals NT and ST, since activation orders always go out from the terminal LT, which functions as master. Both activation request and order are processed on the station side at a higher level than that of the line terminal. In detection of an activation request from the line terminal, a station EX sends an activation order via such terminal. Since the station EX is not part of the inventive subject, it is not described here but is only mentioned for clarifying the inventive concept.

The subscriber terminals ST are normally powered from the network terminal NT. Certain more complex terminals, e.g. display screens, are provided with their own power supply, however. In order to prevent total communication interruption for a power failure in the terminal NT, certain very simple terminals may be remotely powered from the line terminal LT. These simple terminals or so-called Plain Ordinary Telephone Service (POTS) terminals may be given priority and be addressed by an address code included in the synchronization signal.

A further advantage with activation by normal transmission, as in the selected case, is thus that a plurality of individual terminals, e.g. POTS terminals, can be addressed, which is not possible with DC activation. The hardware utilized for normal transmission is used with the selected activation method; only very simple supplementation being necessary. This makes the method both reliable and economically advantageous.

DESCRIPTION OF FIGURES

An apparatus in accordance with the invention is described in detail with the aid of an embodiment and with reference to the accompanying drawings, on which.

PREFERRED EMBODIMENT

Figure 1:
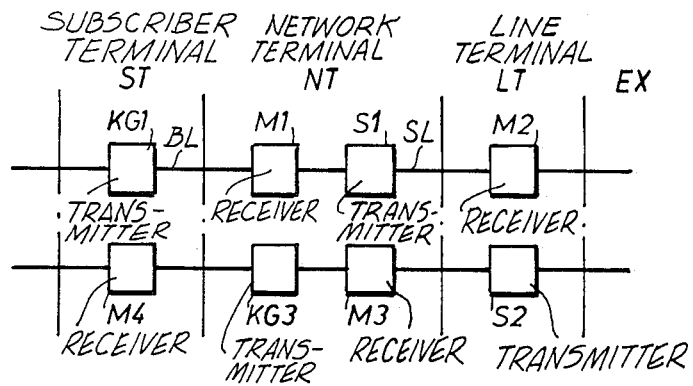
FIG. 1 is a block diagram of a system in which the apparatus in accordance with the invention is applied.

As will be seen from FIG. 1, the apparatus in accordance with the invention is included in a telecommunication system for the activation of subscriber terminals in a digital subscriber connection, this system including a line terminal LT assigned to the station side, a network terminal NT assigned to the subscriber installation and one or more subscriber terminals ST.

A bus line BL internally connects the subscriber terminal ST with the network terminal NT on the subscriber side. The signals are transferred in time division multiplex (TDM) form and in the form of bursts. The information is transferred on the subscriber line SL between the network terminal NL and the line terminal LT in the form of a serially continuous bit flow, i.e. in the normal transfer between the subscriber and station sides.

On activation, the terminals are changed from idling state to active state. Each of the subscriber terminals ST contains a transmitter KG1, a receiver M4 and a local clock pulse oscillator CL1. (See also FIG. 2)

The network terminal NT contains double transmitters S1, KG3, receivers M1, M3, and clock pulse oscillators CL2, CL3, since it sends and receives data bursts in TDM form, to and from the bus line, but sends and receives series, continuous data flows to and from the subscriber line. The line terminal LT contains a receiver M2 and a transmitter S2. The terminal obtains clock pulse control from the central station clock MCL. (See also FIG. 2)

Depending on the position, in the activation cycle, the transmitter S1 may consist either of a code transmitter KS1 for transmitting a continuous cyclic bit pattern, or a frame code generator RG1 for transmitting data information in frame format. The same conditions apply for the transmitter S2 in the line terminal. This transmitter may either be a code transmitter KS2 or a frame code generator RG2. The receivers M2 in the line terminal and M3 in the network terminal are also dependent on the position in the activation cycle. The receiver M2 may be a code receiver CD1 for detecting the received code pattern from the code transmitter KS1, or a frame detector RD2 for detecting data in frame format from the frame code generator RG1. The receiver M3 may be a code receiver CD2 for detecting code patterns from the code transmitter KS2, or a frame detector RD1 for detecting data in frame format from the frame code generator RG2. The enumerated contents of the terminals relate solely to the equipment which is of importance for the activation method. The TDM technique is already known and is therefore not described.

Figure 2:
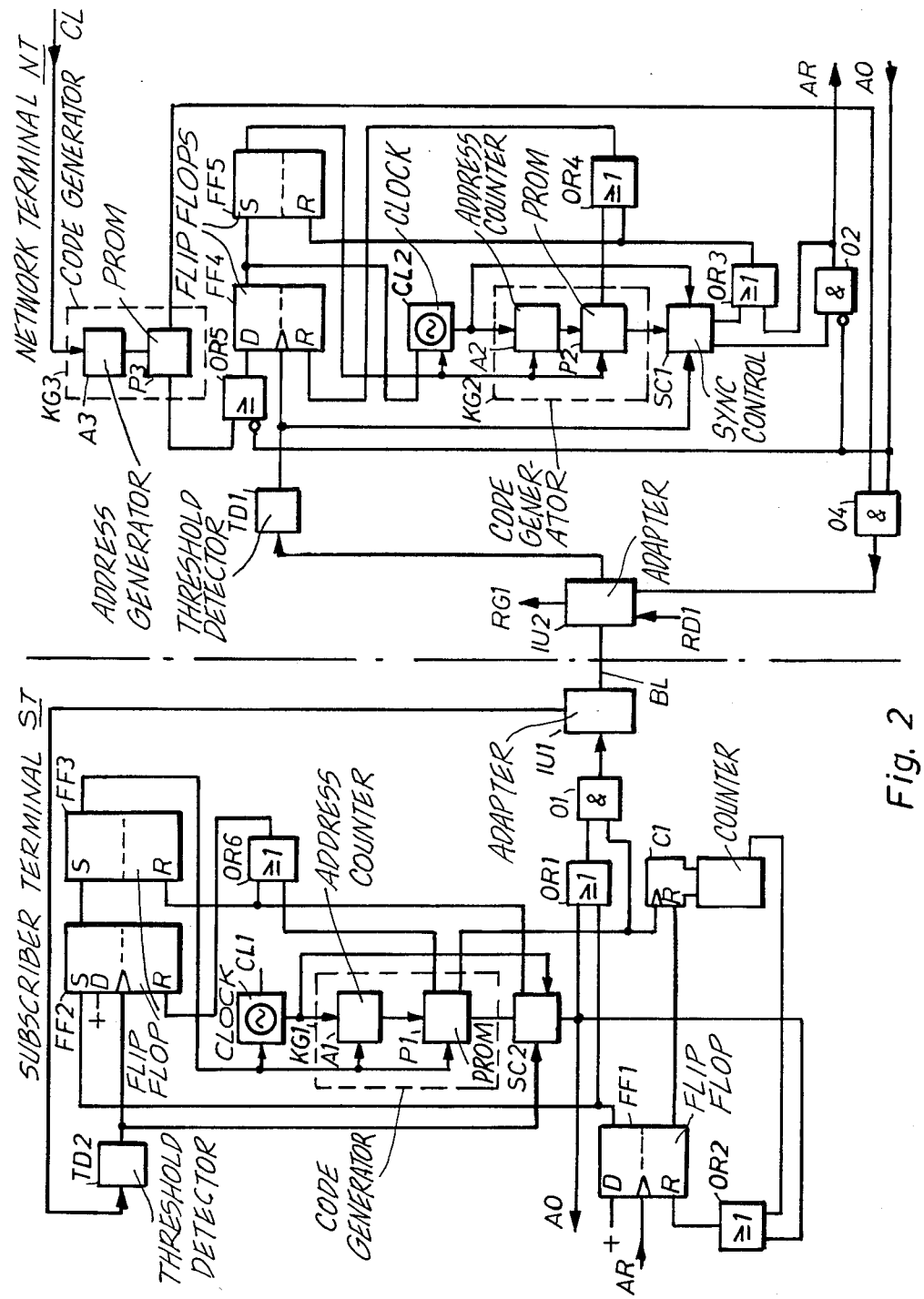
FIG. 2 is a more detailed diagram of the apparatus in a subscriber terminal and a first part of a network terminal.

FIG. 2 illustrates the function for activation and synchronization in the subscriber terminal ST and half the network terminal NT. A sequence where the activation is initiated from the subscriber side will now be described first.

A first type 4013 flipflop FF1 in the subscriber terminal ST receives on a clock input an activation request AR, e.g. in the form of a logical ONE signal. The activation request may be released by the subscriber lifting the receiver, for example, if the terminal is a telephone handset. The flipflop output sends a ONE signal to the setting input on a second type 4013 flipflop FF2. The output signal from flip-flop FF2 activates the setting input on a third type 4013 flipflop FF3, the output signal of which, by connection to ENABLE inputs on a local clock pulse oscillator CL1 and to a first code generator KG1, starts transmission of clock pulse signals from the clock and transmission of a code pattern, a so-called send window from the code generator. This generator contains a type 74 HC 161 address counter A1, to which there is connected a type 2716 PROM P1. Different types of send window are stored in the memory P1 corresponding to binary words of given appearance. The clock signals are connected to inputs on the code generator KG1 and control the burst feed-out of binary code words from the memory P1. In the selected case, the code words are 19 bits long. The code words, i.e. the send windows, are fed to a first input on a gate circuit 01, which is a type 4081 AND circuit. A second input on the AND circuit receives the output signal, i.e. the activation request, from the flipflop FF1 via a type 4071 OR circuit OR1. Bit bursts are sent from the output of the gate circuit 01 to the time division multiplexed bus line BL via an adapter unit IU1 for further passage through the bus to the input on the network terminal NT via a further adapter unit IU2. The code words from the code generator KG1 are also supplied to the input on a type 4516 counter C1, which after receiving three consecutive frames sends a resetting signal to the flipflop FF1 via a second type 4071 OR circuit OR2, the activation process then being stopped.

A first receiver unit M1 included in the network terminal NT contains a first type LM 311 threshold detector TD1, which detects the reception of the activating code words sent from the subscriber terminal ST against a fixed threshold level. The output signal from the threshold detector activates a burst detector in the form of a fourth type 4013 flipflop FF4, the output signal of which activates the setting input on a fifth type 4013 flipflop FF5. The output signal from the flipflop FF5 is applied to the ENABLE inputs on a local clock pulse oscillator CL2 and to a second code generator KG2 consisting of a second address counter A2, to which there is connected a second PROM P2. A temporary synchronization of the clock in the terminal NT to the clock from the terminal ST takes place by the local clock pulse oscillator CL2 in the network terminal being controlled in phase by the output signal from the flipflop FF4. The signal from the clock CL2 is applied to the input on the code generator KG2, in which new code words of 19 bits are generated, which are read out from the mentioned PROM P2. A word length check is made in a sync control circuit SC1 for checking the synchronization between these code words generated locally in the terminal NT and those received from the subscriber terminal ST. The circuit SC1 receives code words from the generator KG2 on a first plurality of inputs and on a second plurality of inputs the activation code words from the output of the threshold detector TD1, a check then being made that the code words on such first and second pluralities of inputs are equal in length, i.e. 19 bits according to the example. The check is carried out under control from clock pulse signals from the local clock pulse oscillator CL2. If the check is approved, i.e. if there is agreement between the code words, a logical ONE signal is sent from the synchronizing control circuit as the activation request AR to the input on a transmitter logic TL1 (FIG. 3) via a second AND circuit 02.

The activation request on the output of the mentioned circuit 02 also activates a third OR circuit OR3, the receiver in the terminal NT assuming an idling state by a resetting signal to the flipflop FF5 directly from the OR circuit OR3 and by a resetting signal to the flipflop FF4 from the circuit OR3 via a fourth OR circuit OR4. Sync loss also leads to the idling state via the circuit OR3. The next burst, i.e. code words from the code generator KG2, sets the burst detector FF4 to zero with the aid of the OR circuit OR4. The burst detector is thus clear to detect new code words from the subscriber terminal ST.

Figure 3:
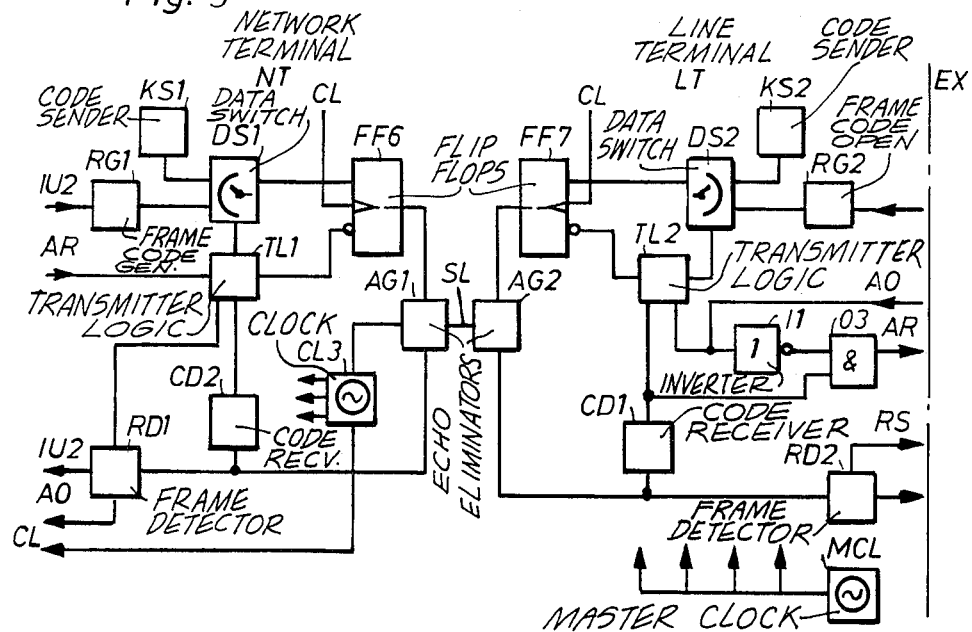
FIG. 3 is a diagram of the apparatus in a second portion of the network terminal and in the line terminal.

As will be seen from FIG. 3, the activation request AR sent from the AND circuit 02 is received on the input to the mentioned send logic TL1. The send logic, consisting of a plurality of mutually linked logical circuits, sends control signals on an output to a two-way type 40257 data switch DS1. The latter in its first position switches through binary signals from a first code transmitter KS1. In its second position, signals in frame format are switched through from a frame code generator RG1. In the mentioned activation from the subscriber, the data switch is put in a position such that a series, continuous, cyclic bit flow is transmitted from the sender KS1, via a sixth type 4013 flipflop FF6, through a first adaptive echo eliminator (adaptive hybrid) AG1, and through a transmission line SL to the line terminal LT on the station side. A first code receiver CD1 in the line terminal detects the incoming data flow via a second adaptive echo eliminator AG2 and, if an activation request is interpreted, it sends this to the station EX in the form of a logical ONE signal through a third AND circuit 03. The station then triggers an activation order signal AO to the input on a second transmit logic TL2 having logical circuits in the line terminal LT. An inverter I1 interrupts the activation request to the station when an activation order AO is sent. Output signals from the send logic activate a seventh type 4013 flipflop FF7, and also a second two-way type 40257 data switch DS2, so that data in frame format and in series form including synchronizing informations is sent out under control of the master clock pulse oscillator MCL from a second frame code generator RG2 back again to the network terminal NT on the subscriber side, through the seventh flipflop FF7. In its second position the data switch switches through binary information from a second code transmitter KS2. A third local clock pulse oscillator CL3, included in the network terminal, is synchronized conventionally to the master clock pulse rate transferred in the received bit flow. For detected frame synchronizing information in a frame detector circuit RD1 there are sent control signals to the transmit logic TL1 to enable, as previously described, transmission of information appropriate for the moment in frame format form towards the line terminal LT. Dectection of frame-synchronous information in the terminal LT is carried out in a second frame detector RD2, and is interpreted as the activation having been successful, this being indicated towards the station EX by an approval signal RS. The circuit RD1 further passes on the activation order signal AO to a first input on a fourth AND circuit 04. The clock signal from the clock CL3 controls a third code generator KG3 containing a third address counter A3 and a third PROM P3 connected thereto, both of the same types as the ones previously discussed. In activation, the memory P3 provides a send window and a receive window. The send window is applied to the second input of the fourth AND circuit 04, the AND circuit then sending bit patterns in the form of bursts through the adapter unit IU2 and the bus line BL to the subscriber terminal ST. The receiver window from the PROM P3 is applied to a first input of a fifth OR circuit OR5, whereon the output signal from the OR circuit is applied to the input on the receiver flipflop FF4 which is thus blocked, and prevents synchronizing flanks occuring on the flipflop output when the terminal NT sends out bit bursts itself. Such flanks must only occur when the terminal NT receives bursts from the subscriber terminal ST. The second input of the OR circuit OR5 is inverting and the activation order signal is applied to it for setting the flipflop FF4 in a standby condition on the occasions when the activation order is *not* present, the receiver then being ready to receive bit bursts from the subscriber terminal.

In the subscriber terminal ST the bit bursts from the network terminal pass through the first adapter circuit IU1 and are fed to the input on the fourth receiver M4 containing a second type LM 311 threshold detector TD2. The output signal from the dectector triggers the flipflops FF2 and FF3, the output signal from flipflop FF3 then synchronizing the rate of the local clock CL1 to the rate of the station clock MCL. The clock starts the code generator KG1, send windows being read out from the memory P1 to a first plurality of inputs on a second sync control circuit SC2, which receives on a second plurality of inputs the bit pattern sent from the network terminal. Comparison is made between the word lengths as previously described, and on agreement, an activation order signal AO goes from the output of the circuit SC2 to the subscriber installation, the logical circuits of which are thus finally activated. A resetting signal is given through a sixth OR circuit OR6 to the flipflops FF2 and FF3 from the code generator KG1 and the synchronizing control circuit SC1, respectively, for return to idle condition and stand by for receiving the next bit burst from the terminal NT.

In the cases where three consecutive frames have been sent towards the network terminal, or when the activation order is sent towards the subscriber, the second OR circuit OR2 is activated and the output signal from the OR circuit stops further sending of bit bursts towards the network terminal NT by blocking the flipflop FF1.

For station-initiated activation, the activation order AO goes to the send logic TL2, which activates the flipflop FF7 thus enabling the transmission of a code pattern from the code transmitter KS2 towards the subscriber side. In the network terminal NT the clock CL3 is synchronized to the master rate from the received bit flow, the code is detected in the code receiver CD2, which then starts the code transmitter KS1. The code transmitter KS1 sends continuous, cyclic bit patterns to the station side, where the code is detected in the code receiver CD1. After detection the frame code generator RG2 sends out data in frame format and synchronizing information towards the network terminal under control of the master clock. On the subscriber side, frame format-frame synchronization is detected in the frame detector RD1, which sends out an activation order towards the subscriber, and via the send logic TL1 controls sending of frame format data from the frame code generator RG1 back again to the station side. In the line terminal, the frame detector RD2 detects frame format-frame synchronization and indicates by an approval signal RS to the station that the connection is bit- and frame-synchronous. The activation procedure is otherwise in entire agreement with activation from the subscriber side.

I claim:

1. In a telecommunication system including a subscriber terminal with a local clock connected via a TDM bus to a network terminal with a local clock in turn connected via a subscriber line to a line terminal connected to a central clock of the master station with which the line terminal communicates, the method of activating the subscriber terminal in a digital subscriber connection from the subscriber terminal side comprising the steps of transmitting from the subscriber terminal an activation request in the form of at least one binary coded information in synchronism with the local clock via the TDM bus to the network terminal for temporarily synchronizing the local clock of the network terminal to the local clock of the subscriber terminal, in response thereto the network terminal transmitting an activation request in the form of an asynchronous serial bit flow via the subscriber line to the line terminal, in response to the activation request from the network terminal, the line terminal transmitting an activation request signal to the master station, the master station in response to the receipt of the activation request signal transmitting an activation order signal to the line terminal, in response to the activation order signal the line terminal transmitting an activation order in the form of a continuous cyclic bit flow and a synchronizing signal to the network terminal for synchronizing a local clock therein to the central clock, and the network terminal in response thereto transmitting the activation order in the form of bit bursts and the synchronizing signal via the TDM bus to the subscriber terminal for activating the terminal and synchronizing the local clock to the central clock whereby a communication loop is established between the subscriber terminal-the network terminal-the line terminal-the network terminal-and the subscriber terminal.

2. In a telecommunication system including a subscriber terminal with a local clock connected via a TDM bus to a network terminal with a local clock in turn connected via a subscriber line to a line terminal connected to a central clock of the master station with which the line terminal communicates, the method of activating the subscriber terminal in a digital subscriber connection from the central station side comprising the steps of the master station transmitting an activation order signal to the line terminal, in response to the activation order signal the line terminal transmitting an activation order in the form of a continuous cyclic bit flow and a synchronizing signal to the network terminal for synchronizing a local clock therein to the central clock, and the network terminal in response thereto transmitting the activation order in the form of bit bursts and the synchronizing signal via the TDM bus to the subscriber terminal for activating the terminal and synchronizing the local clock to the central clock wherein a communication loop is established between the subscriber terminal-the network terminal-the line terminal-the network terminal-and the subscriber terminal.

3. The method of claim 1 wherein there are a plurality of addressable subscriber terminals and further comprising including in an activation order a subscriber terminal address.

4. In a telecommunication system, activation apparatus connecting at least one subscriber installation capable of generating an activation request signal to a central station capable of generating an activation order signal, said activation apparatus comprising:

a subscriber terminal, a TDM line bus a network terminal a subscriber line and a line terminal serially connected between the subscriber installation and the central station, said subscriber terminal comprising a first local clock pulse generator and a first transmitter means for transmitting onto said TDM line bus, in response to the receipt of an activation request signal from the subscriber installation, a representation of said activation request signal in the form of binary codes bursts in synchronism with said first local clock pulse generator;

said network terminal comprising a second local clock pulse generator a first receiver means connected to said TDM line bus for detecting the activation request signal from said subscriber terminal in the form binary bit bursts and temporarily synchronizing said second local clock pulse generator to said local clock pulse generator via the activation request signal, a third local clock pulse generator form a continuous, cyclic bit pattern representing the activation request signal to said subscriber line in synchronism with said third local clock pulse generator;

said line terminal comprising a master clock pulse generator, a second receiver means connected to said subscriber line for transmitting to the central station an activation request signal upon detection of said continuous cyclic bit pattern on said subscriber line and a third transmitter means actuatable by an activation order signal from the central station under the control of said master clock generator for transmitting other series, continuous, cyclic bit flows in synchronism with the pulses of said master clock pulse generator to said subscriber line, said other series representing an activation order signal;

said network terminal further comprising third receiver means connected to said subscriber line for synchronizing said second and third clock pulse, generators through the agency of the bit flows, with said master clock pulse generator and a fourth transmitter means under control of said third clock pulse generator in synchronism with said master clock pulse transmitting an activation order in the form of bit bursts and synchronizing signals to said TDM line bus; and said subscriber terminal further comprising logic circuits and fourth receiver means and connected to said TDM line bus for activating said logic circuits and/or synchronizing said first local clock pulse generator with said master clock pulse generator via said synchronizing signals.

* * * * *